May 8, 1951 F. JERMAŘ 2,551,678

HYDRAULIC STRUCTURE AND THE LIKE

Filed Jan. 27, 1949 3 Sheets-Sheet 1

FIG. 1.

INVENTOR.
Františeck Jermař
BY
Michael S. Striker

May 8, 1951 F. JERMÁŘ 2,551,678
HYDRAULIC STRUCTURE AND THE LIKE
Filed Jan. 27, 1949 3 Sheets-Sheet 2

INVENTOR.
František Jermář
BY

Patented May 8, 1951

2,551,678

UNITED STATES PATENT OFFICE 2,551,678

HYDRAULIC STRUCTURE AND THE LIKE

František Jermář, Prague, Czechoslovakia

Application January 27, 1949, Serial No. 73,165
In Czechoslovakia February 12, 1948

8 Claims. (Cl. 61—25)

The present invention concerns a hydraulic structure between two different water levels, which may be used either as lock or sluice gate, as wicket, collapsible weir, water seal and the like.

It is an object of the invention to provide a gate structure or the like, which may be brought to either position without the use of mechanical power for driving, by using solely the hydrostatic pressure of different water levels or the action of a floater chamber respectively.

It is a further object to achieve the flow of water between both water levels preventing any air entering the connecting channels.

It is a further object of the invention to provide a gate structure able to remain stationary in any intermediate position.

Still further objects of the invention are to provide a gate structure enabling floating bodies as logs and similar objects to pass the gate with the overflowing water without difficulties.

Other objects and advantages of my invention will be apparent from the following specification in conjunction with the accompanying drawings.

According to one aspect of the invention the structure comprises two doors, arranged in different height, mounted jointly and pivotally around a horizontal axis on the supporting structure, the front of the upper door being subject to hydrostatic pressure urging this door to an upright position, whereas the lower door engages by means of its face closely into a chamber behind the back of the lower door with means alternatively connecting said chamber with the upper or lower water level, thus either substantially equalising the hydrostatic pressure upon both sides of said lower door, or letting the hydrostatic pressure from the upper level act upon said lower door urging thus both doors to be turned against the turning moment due to the hydrostatic pressure upon the upper door to the downright position.

Figure 2:
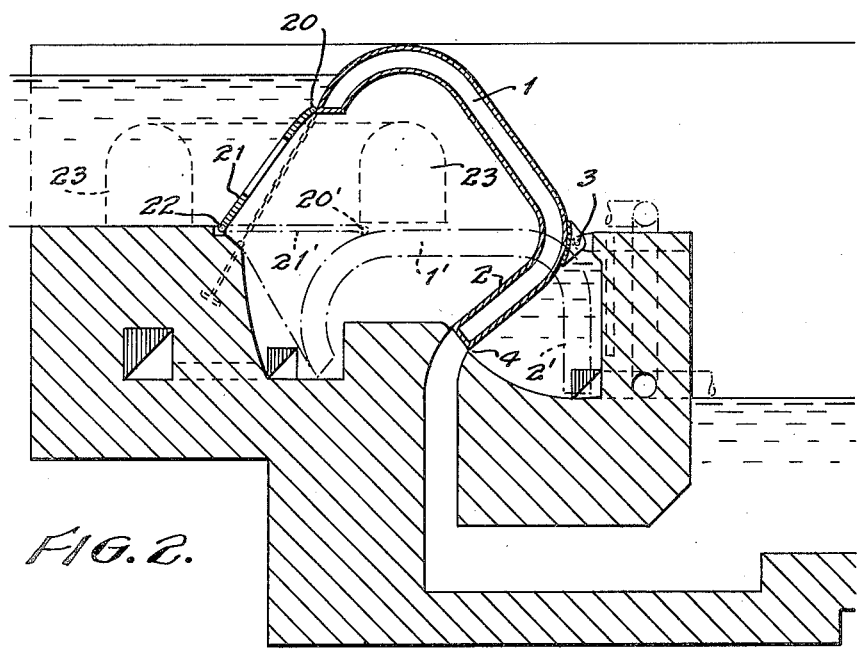
Figure 3:
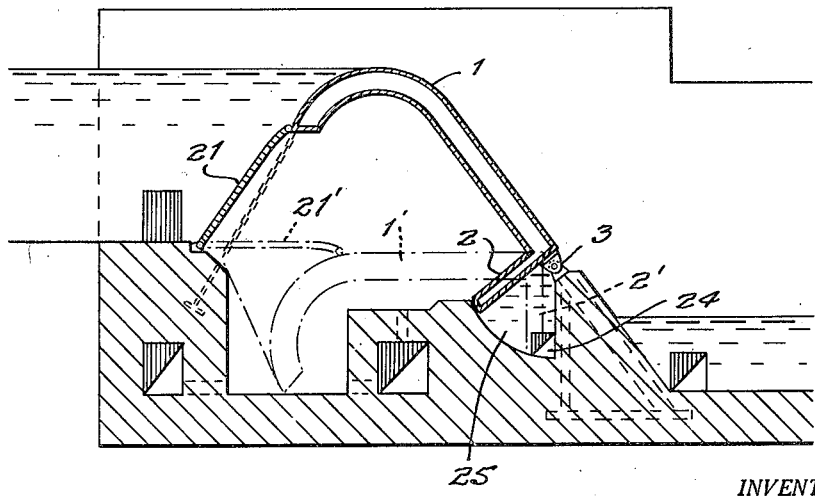
Figure 4:
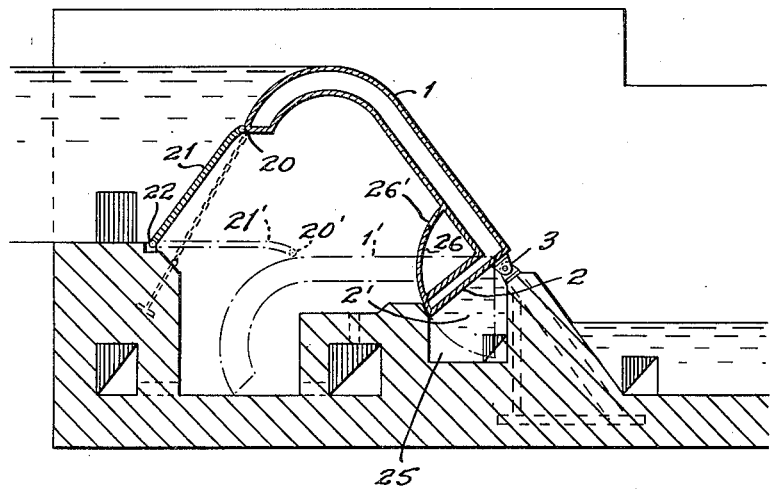
Figure 5:
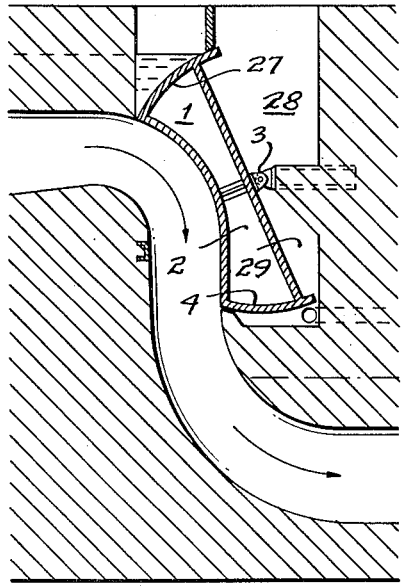
Figure 6:
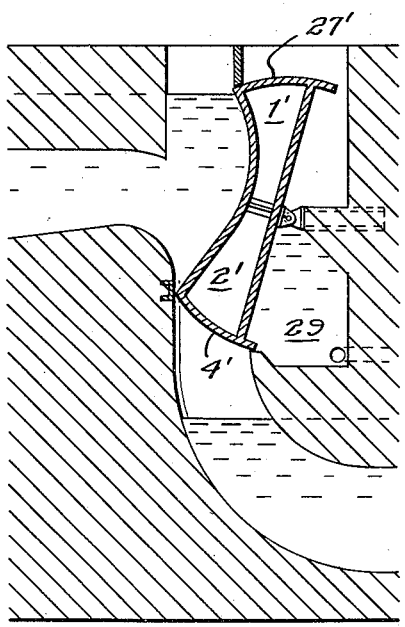

Further details and alternatives of the gate structure will be apparent from the following specification with reference to the accompanying drawings, where Fig. 1 shows a schematic cross section of a lock gate, Figs. 2, 3 and 4 cross sections of lock gates of different design suitable to pass floating bodies, Figs. 5 and 6 sections of a water seal used in a channel connecting two different water levels.

Referring to Fig. 1 the gate structure consists of two doors 1 and 2 respectively, pivotally mounted around the axis 3 on the supporting structure. Both doors 1 and 2 are angularly displaced and are forming a unit simultaneously controlled. The upper of said doors 1 is in case, the gate is closed in an upright position as indicated, the lower door 2 engages by means of its face 10 into a chamber 4 in the supporting structure, having a cylindrical wall 5 conforming with the path of the face 10 of the lower door 2. An inlet and channel 6 into the calming chamber 7 is arranged in the wall 5, said channel connecting the upper water level 8 with the lower water level 9. The inlet 6 is closed by the face 10 of the gate door 2. A channel 11 is terminating into the chamber 4, said channel dividing into the filling channel 12, connected with the upper level 8 and the emptying channel 13 connected with the lower level 9. A double valve not shown is either arranged, enabling the channel 11 and the chamber 4 to be alternatively connected with the upper or lower water level or separate water seals 114 and 115 are arranged in each of the channels 12 and 13 respectively as shown in Fig. 1. It is advantageous, that the emptying channel 13 terminates into the lower water 9 at a place distant from the gate in case of small differences of water levels to ensure proper functioning of the gate doors.

A part of the door 1 according to Fig. 1 is arranged as floating chamber 14. It is of course possible to make the whole door 1 a floating chamber, similarly also the lower gate door 2. The floating chamber 14 is preferably provided with means for letting in water from the upper water level and for emptying. This may be accomplished for instance by channels 15, 16 connecting the chamber 14 with the chamber 3' in the neighbourhood of the pivoting axis 3. This enables to control the floating chamber 14 under any height of the lower water level.

In the normal upright position A of the door 1 the water seal 115 is closed and the seal 114 opened, the chamber 4 being thus connected with the upper level through channel 12. The hydrostatic pressures upon the lower door 2 from both sides are substantially equal and the hydrostatic pressure upon the front of the upper door 1 tends to hold this door in the upright position. The face 10 of the lower door 2 closes the inlet 6 into the calming chamber 7. If we want to open the gate, we close the seal 114 and let the water from the chamber 4 out into the lower water level by opening the seal 115. Thus the hydrostatic pressure from below upon the lower door 2 is removed so that the turning moment due to hydrostatic pressure upon the lower door 2, which is larger than that due to hydrostatic pressure upon the upper door 1 starts to move the upper door against the direction of the incoming water. In the intermediate position B shown in broken lines, which is most effective for the flowing of water, the inlet 6 is fully open. The flowing of water goes on, as obvious without access of any air. If the doors are moved further, the flow of water may be speeded up by overflowing. By regulating the opening of the seal 115, it is possible to control at will the movement of the gate doors and stop this movement in any intermediate position. The full opening is achieved in the position C, shown in broken lines. The closing movement of the gate doors is achieved by closing the seal 115 and opening the seal 114 whereby the chamber 4 is again filled from the upper water level. The lifting of the doors is eased by the floating chamber 14 compensating part of their weight and other resistances.

In case of smaller differences of water levels, the doors are kept in the open position by filling the floating chamber 14 with water. Their lifting is achieved by letting out the water. This problem may be solved also by terminating the channel 13 into the water below the gate within a distance that safeguards the required difference of water levels.

By actuating the gate without access of air a high efficiency and lower corrosion of the metal parts is achieved.

In Fig. 2 a similar embodiment is shown, the door 1 is however of a shape bent in the direction of the incoming water in order to allow floating bodies such as logs pass the gate or weir with the overflowing water undisturbed when the upper part of this door is lowered below the upper water level. A grate 21 pivoting around the axis 22 is leaning by means of rollers 20 against the upper door 1. This grate is arranged according to local conditions either within the full width and height of the gate or weir or only within parts of it. In the lower position the doors and grate are taking the positions 1', 2' and 21'. This arrangement is advantageous also, if the doors are used only for filling of the lock or the like. Floating bodies are taken along into the lock or the like not from below but above the lowered upper door by the overflowing water, which is rather more advantageous and safer.

The function of the doors does not change even if the grate 21 is replaced by a full covering plate. A by pass channel 23 is then used letting in the water from the upper level into the chamber formed by the upper door 1 and the auxiliary covering plate 21 (see Fig. 3). In this arrangement the hydraulic gate structure fulfills fully the requirements called for, namely an uninterrupted filling of the lock or the like and safe transfer of overflowing high water and floating bodies.

The arrangement with the bent upper door 1 and a covering plate 21 may be advantageously used as weir, especially in cases, where the upper water level should be maintained at a given height i. e. where the structure should be kept at any intermediate position. In this case the lower gate door 2 acts when lowering the doors as a brake or a setting means, for by closing the channel 24 the water in the chamber 25 acts as an uncompressible cushion against which the gate door 2 is leaning. By connecting the channel 24 with the upper level the gate doors are again forced upwards as soon as a certain difference of water levels is present.

The lower gate door 2 has therefore in this arrangement the function to bring the whole gate into any required intermediate position and to maintain it in this position.

If a solid covering plate 21 is used, the space below this plate 21 and the upper door 1 may be emptied, keeping the hydrostatic pressure from the upper water level in the chamber 25. The gate structure may be thus controlled by hydrostatic pressure in this chamber.

The cylindrical wall 5 of the chamber 4 (see Fig. 1) or 25 (Fig. 3) is not required when using a cylindrical segment 26 as shown in Fig. 4. The function of the whole arrangement is similar to the above described, the water is entering into the space formed by the segment 26 and the gate door 2 through openings 26'. The advantage of this alternative is the simple through-shaped form of the chamber 25.

The arrangement as shown may be equally used as water seal for water ducts, channels, for release channels of high water dams, sewage channels and the like.

Figs. 5 and 6 are showing in section in two different positions such a seal for a by pass channel of a navigation lock. Both the upper and lower doors 1 and 2 are provided with cylindrical faces. Due to the cylindrical face 27 of the upper door the stationary forces of the upper water upon this face are in the direction towards the axis coincident with the pivoting axis 3. Floater chambers are here not suitable as there is always an empty chamber 28 behind the upper door 1. When filling the chamber 29 behind the lower door 2 from the upper water level, the hydrostatic pressures upon both sides of this door are substantially equal and the moment due to pressure upon the upper door 1 closes the channel, bringing both doors into the position shown in Fig. 6. By emptying the chamber 29, the position according to Fig. 5 is reestablished.

Having now particularly described and ascertained the nature of my said invention, and in what manner the same is to be performed, I declare, that what I claim is:

1. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; and means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position.

2. Hydraulic control means adapted to be disposed between two water levels of different heights for controlling at least one of said levels, said hydraulic control means including a stationary supporting structure located substantially at the point of meeting of the two water levels and having a chamber opening upwardly to the water of the higher level; a door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber, and a further door portion integrally fixed on said door and projecting to a position extending above the level of the hinged portion in the closing position of said door but extending to said level of said hinged portion when said door is in its withdrawn position, and the front side of said door is exposed to the water of the higher level; and means for alternatively connecting said chamber behind the inner side of said door with the upper or lower water level and thereby either substantially equalizing the hydrostatic pressure upon both sides of said door, or causing the hydrostatic pressure from the upper water level to act on the front side alone of said door.

3. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; and means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position, and said stationary supporting structure having a by-pass channel between both water levels disposed with the inlet opening thereof in said stationary structure located behind the inner side of said lower door in effective position to be closed by the latter in withdrawn position thereof.

4. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; and means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position, and said stationary supporting structure having a second chamber distinct from the first mentioned chamber and also opening to the water of the higher level and disposed in effective position to receive said upper door in withdrawn position of said lower door.

5. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position, and said stationary supporting structure having a second chamber distinct from the first mentioned chamber and also opening to the water of the higher level and disposed in effective position to receive said upper door in withdrawn position of said lower door; means for filling said chambers from the water of the upper level; and means for draining said chambers into the water of the lower level.

6. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; and means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position, said upper door being at least inclined in the direction of the incoming water of the higher level in the closing position of the lower door in order to facilitate passage of objects floating in said water at the higher level over said upper door with water flowing from said higher level over the latter.

7. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position; and partial cylindrical end portions on the free ends of both doors centered on the pivoting axis of said doors, with the cylindrical end portion on the lower door cooperating with one end of said chamber in all positions of said lower door to fit in said chamber.

8. Hydraulic control means adapted to be disposed between two water levels of different heights for controlling at least one of said levels, said hydraulic control means including a stationary supporting structure located substantially at the point of meeting of the two water levels and having a chamber opening to the water of the higher level; a lower door hinged about a horizontal axis at the upper portion thereof to said stationary supporting structure at the top of the chamber in effective relation thereto to swing into a withdrawn position in said chamber and outwardly therefrom to an active position in which said door forms a virtual closure for said chamber; an upper door rigidly secured to said lower door adjacent to the hinged portion of the latter and disposed in such relative position thereto as to expose the front side of the upper door to hydrostatic pressure of the water of the higher level in the closing position of said lower door and to expose the front side of the latter to hydrostatic pressure from said water of said higher level and tending to urge the upper door into upright position; means for alternatively connecting said chamber behind the inner side of said lower door with the water of the higher or lower level and thereby either substantially equalizing the hydrostatic pressure on both sides of said lower door or causing the hydrostatic pressure from the water of higher level to act on the front side alone of said lower door, whereby to urge said lower door into withdrawn position in said chamber against the pressure moment due to hydrostatic pressure exerted against the front side of said upper door when said lower door is in its closing position, both doors together forming a collapsible weir and said upper door being bent in the direction of the incoming water of the higher level in order to facilitate passage of objects floating in said water at the higher level over said upper door with water flowing from said higher level over the latter in the closing position of said lower door; and a covering plate pivotally mounted on said stationary supporting structure upon a horizontal pivot axis and leaning outwardly in the direction of flow of the water of said higher level against the upper portion of said upper door.

FRANTIŠEK JERMÁŘ.

REFERENCES CITED

The following references are of record in the file of this patent:

UNITED STATES PATENTS

| Number | Name | Date |
| --- | --- | --- |
| 1,989,457 | Lutz | Jan. 29, 1935 |
| 2,074,610 | Jermar | Mar. 23, 1937 |

FOREIGN PATENTS

| Number | Country | Date |
| --- | --- | --- |
| 46,359 | France | 1936 |
| 800,757 | France | 1936 |